July 25, 1933.　　　J. M. CHRISTMAN　　　1,919,290
MILLING MACHINE
Filed April 1, 1930　　　3 Sheets-Sheet 1

Inventor
John M Christman,
By Watson, Cait, Morse & Grindle
Attorneys

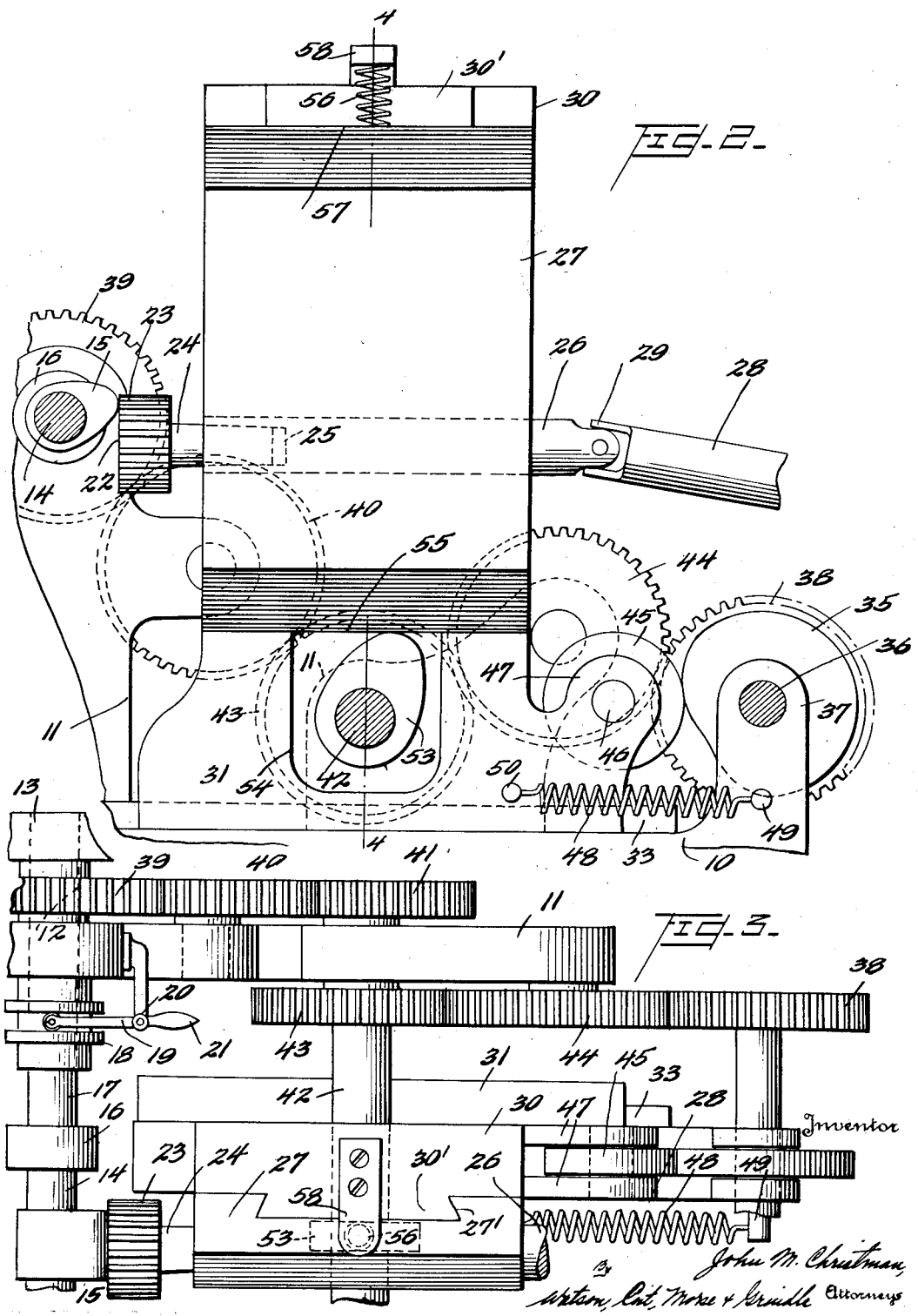

July 25, 1933.  J. M. CHRISTMAN  1,919,290
MILLING MACHINE
Filed April 1, 1930   3 Sheets-Sheet 3
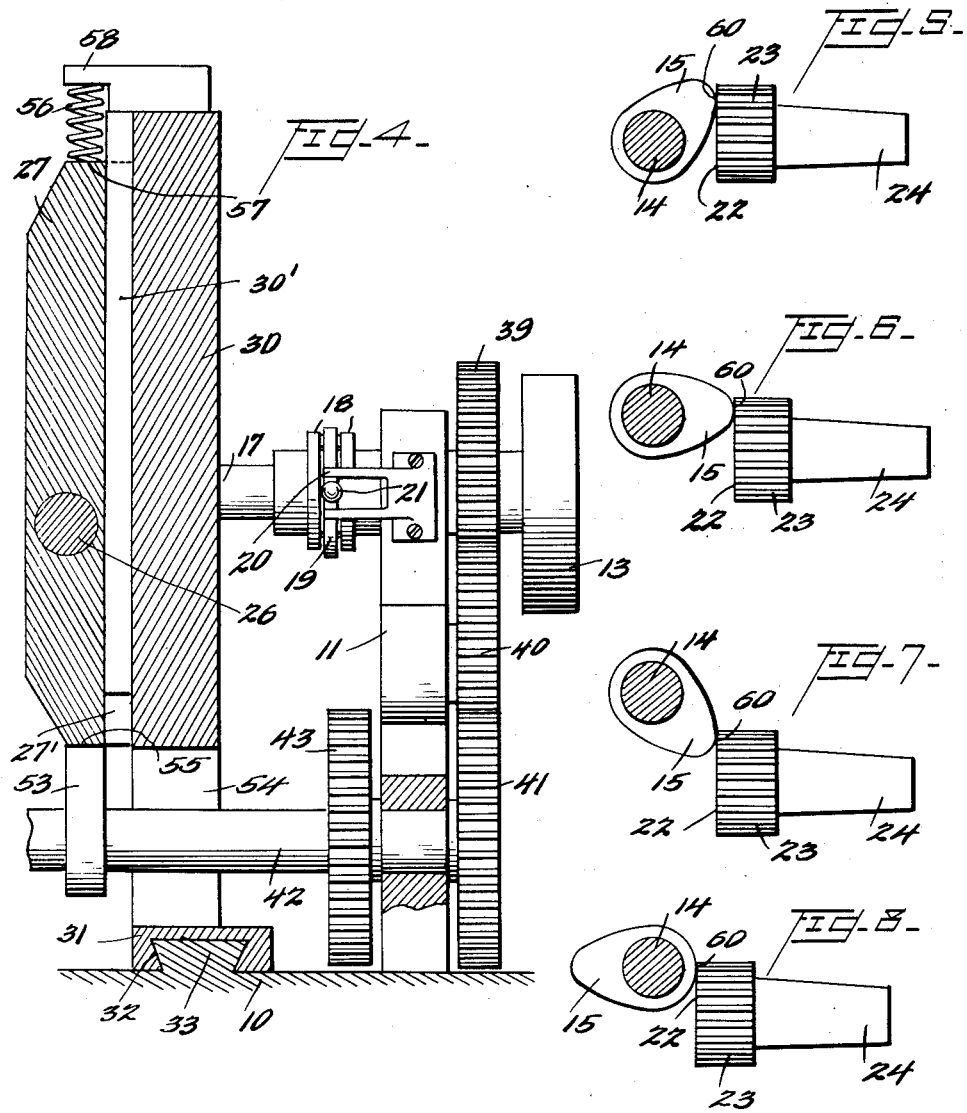
Inventor
John M. Christman,
By Watson, Coit, Morse & Grindle
Attorneys Patented July 25, 1933

1,919,290

UNITED STATES PATENT OFFICE

JOHN M. CHRISTMAN, OF DETROIT, MICHIGAN, ASSIGNOR TO PACKARD MOTOR CAR COMPANY, OF DETROIT, MICHIGAN, A CORPORATION OF MICHIGAN

MILLING MACHINE

Application filed April 1, 1930. Serial No. 440,766.

This invention relates to tools for machining metal parts and particularly to what may be termed pattern lathes or lathes for turning non-circular cylinders.

It is a general object of the present invention to provide a novel and improved machine of the type described.

More particularly it is an object of the invention to provide a lathe of the pattern type for turning irregular shaped objects and particularly non-circular cylinders.

An important feature of the invention resides in the provision of a rotary cutting tool for use with machines of the type described. This tool may well be of the so-called end mill type.

Another important feature of the invention comprises mechanism for synchronously moving the tool toward and from the work along an axis substantially parallel to a line normal to the work, in accordance with a predetermined profile whereby a non-circular cylinder is produced of the required configuration.

Another important feature of the invention resides in the reciprocation of the tool carrier and hence the tool in a direction at right angles to the movement of the tool for obtaining the desired configuration and also at right angles to the axis of rotation of the work and in synchronism to this rotation at such a rate as to maintain the most effective cutting portion of the tool always in engagement with the work.

Other important features and objects of the invention will be more apparent to those skilled in this art upon a consideration of the accompanying drawings and following specification wherein is disclosed a single exemplary embodiment of the invention with the understanding, however, that such changes may be made therein as fall within the scope of the appended claims without departing from the spirit of the invention.

In said drawings:

Figure 2 is a vertical section through the machine in a plane at right angles to the axis of rotation of the work and showing the tool operating mechanism in elevation;

Figure 3 is a plan view of a portion of the machine;

Figure 4 is a vertical section on line 4—4 of Figure 2; and

Figures 5, 6, 7 and 8 show respective positions of the tool for various angular positions of the work.

Figure 1:
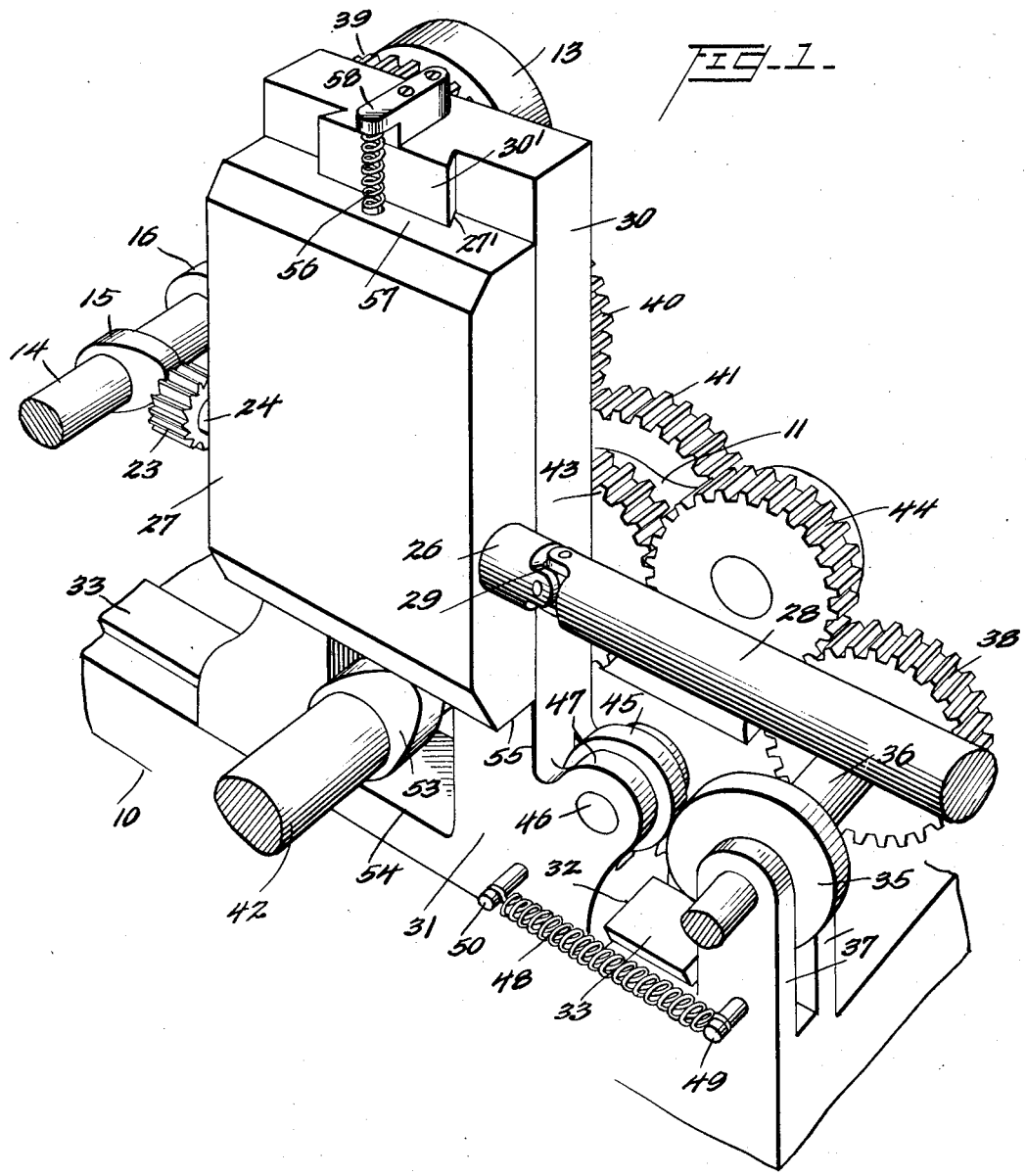
Figure 1 is a perspective view of the portion of the machine necessary for operating on a single cylinder.

The machine of the present invention is of the type used for turning or machining irregular objects and for the sake of convenience has been shown and described in connection with a machine for profiling the cams on the cam shaft of an internal combustion engine. In its entirety, the machine is provided with a plurality of units each adapted to act on a single cam. There can be as many units as cams on the shaft or if the cams are too close to permit this, there can be half as many units, requiring, then, a single longitudinal shift of the work between operations on the alternate cams. The machine is equally useful for turning the cheeks of the cranks on crank shafts and for like work.

As seen in the drawings, the machine is essentially a lathe, having a bed or shear 10 which has formed preferably integrally therewith and at one end, the suitable bearing member 11 having rotatably mounted therein the shaft 12 adapted to be driven in any convenient way as by a belt and pulley 13. At the opposite end of the bed is preferably a dead center or a rotatable work holder. The work, shown as a cam shaft 14 having rough cams 15 thereon, is adapted to be mounted between the dead center and the chuck 16 secured to the sleeve 17 which is suitably splined to the shaft 12 and slidable longitudinally thereof as by means of the flanges 18 and the fork 19 pivoted at 20 and provided with a handle 21. The purpose of this arrangement is to permit of a longitudinal movement of the work to traverse it along the cutters. This feeding mechanism may be hand operated or automatic as is common in this art.

The cutting tool is in the form of an end mill, that is, it is a standard milling tool adapted to cut on the end as shown at 22, it is also fluted on the sides as at 23 so that as it is traversed along the work, the sides do a portion of the cutting. This tool has a tapered shank 24 received in a socket 25 in the shaft 26 journaled for rotation only, in the tool carrier 27. A second section of shaft 28 is attached by a universal joint 29 to the section 26 and is suitably attached by means of a slip joint and an additional universal joint (not shown) to any suitable power means for driving the cutting tool.

The tool carrier 27 is in the form of a block, substantially rectangular in form and provided on one surface with a channel 27′ adapted to engage over the dovetailed ways 30′ on the vertical extending slab portion 30 of a carriage 31. The tool carrier can thus be said to be mounted for reciprocation on the carriage in order to move the tool face in a plane which is parallel to a tangent to an arc about the center of rotation of the work.

The carriage 31 has its base portion grooved as at 32 to fit over the dovetailed ways 33 on the base or shear 10 of the lathe so that it can be reciprocated toward and from the work, preferably in a plane at right angles to the axis of rotation of the work.

As the carriage reciprocates, the tool moves with it and profiles the work in accordance with the outline of the carriage operating cam 35. This cam is mounted on a shaft 36 supported in bearings 37 one on either side of the cam. This shaft is provided with a spur gear 38 which is driven by means of a gear train from the gear 39 on the shaft 12 driven by the pulley 13. The intermediate gears of the train are arranged on the two sides of the bearing 11. Thus there is an idler gear 40 driven from the gear 39 and this idler gear drives the gear 41 mounted on a shaft 42 which extends the length of the lathe bed and parallel to the shaft 36. Just inside of the bearing 11 this shaft 42 is provided with a gear 43 and between the gear 43 and the gear 38 is the idler gear 44. The gear train is such that the shafts 36 and 42 are driven at the same speed as and in the same direction as the main shaft 12 which drives the work.

The cam 35 mounted on the shaft 36 bears against a roller 45 carried on a stub shaft 46 mounted in extensions 47 on the carriage and is instrumental in moving the carriage and its tool toward the work. A coil spring 48 secured at its ends between the pin 49 on the bed and the pin 50 on the carriage serves to keep the roller 45 always in engagement with the cam 35 so that the motion of the carriage is exactly that imparted to it by the cam which rotates and thus actuates the carriage in synchronism to the rotation of the shaft of the work holder. In this way by suitably profiling the cam 35 and properly setting a blank with rough cams thereon in the work holder with due regard to the angularity of the cam blank thereof in respect to the cam 35, the cam 15 thereon can be machined as desired. Of course, the machining is accomplished by traversing the work in respect to the cutter as by means of the feed mechanism 19.

However, it is not sufficient to merely feed the tool toward and from the work in accordance with the profile of the cam 35, for tools of the end mill type operate at their best efficiency when the main cutting is done close to the periphery. To accomplish this the tool carrier 27, as previously mentioned, can be reciprocated vertically on the slab portion of the carriage. This vertical reciprocation is effected by a suitable cam 53 mounted on the shaft 42, previously mentioned, which passes through an opening 54 in the carriage to provide clearance for the movement of the carriage. The lower edge 55 of the tool carrier 27 rests on the periphery of the cam 53 and is held in this position by means of the coil spring 56 bearing between the top surface 57 of the tool carrier and the under surface of the overhanging lug 58 secured to the top of the slab 30.

As before mentioned, the shaft 42 and hence the cam 53 moves in synchronism with the work holder and hence by properly positioning the cam in regard to its angularity and, by properly profiling it, the tool can be made to cut in the most effective manner as shown in Figures 5 to 8. It is seen that in Figure 5 the center line of the tool is about at the same level as the axis of the work but the cutting portion of the tool is at 60 near its periphery. In Figure 6 where the cam has reached the position where its major lobe is horizontal, the tool has been lowered until its axis is materially below that of the cam but still the cutting point is at 60. In Figure 7 where the cam lobe has turned 45° down from the position in Figure 6, the tool has been lowered still further by the action of the cam 53 and contact is still maintained at 60. Substantially the same condition prevails in Figure 8 where the cutting is now on the heel of the cam. It may be said that the tool is moved both fore and aft and vertically in synchronism with the rotation of the work holder and under the control of two cams, one of which profiles the work as desired and the other of which maintains the most effective cutting annulus of the tool in operative relationship to the work.

It will, of course, be obvious that various other means of actuating the tool and its carrier for obtaining the same result are available but it is the intent of the appended claims to cover the various embodiments which fall within their scope. By having the cutting tool always rotating and not depending on the rotation of the work in respect to the tool to provide the cutting force.

the lathe can be driven at a slower speed and the work need make but a few revolutions to complete an operation. No attempt need be made as in some previous types of machines to maintain the cutting edge of the tool always normal to the work which involves complicated mechanism for rotating the tool about an axis parallel to the axis of the work.

It will be understood that while the invention has been disclosed in a machine wherein the traverse is parallel to the axis of the work, the tool motion for profiling horizontal and the tool motion for cutting efficiency vertical, that these relationships can be adjusted to suit conditions without departing from the spirit of the invention.

Having thus described my invention, what is claimed as new and desired to be secured by Letters Patent is:

1. In a machine, the combination with a work holder and means for continuously rotating it, of a carriage mounted to move toward and from the work substantially normal to the work rotating axis, means for moving the carriage in synchronism with the rotation of the work holder, a tool support carried by said carriage and mounted to move thereon always in a right line at right angles to the movement of the carriage in a plane normal to the work rotating axis, means for moving the tool supporting synchronism with the rotation of the work holder, and a tool mounted on said support.

2. In a machine, the combination with a work holder and means for continuously rotating it, of a carriage mounted to move toward and from the work substantially normal to the work rotating axis, means for moving the carriage in synchronism with the rotation of the work holder, a tool support carried by said carriage and mounted to move thereon at right angles to the movement of the carriage in a plane normal to the work rotating axis, means for moving the tool support in synchronism with the rotation of the work holder, a rotatable cutting tool mounted on said support, and means to drive said cutting tool to profile the work.

3. In a machine, the combination with a work holder and means for continuously rotating it, of a carriage mounted to move toward and from the work substantially normal to the work rotating axis, means for moving the carriage in synchronism with the rotation of the work holder, a tool support carried by said carriage and mounted to move thereon at right angles to the movement of the carriage in a plane normal to the work rotating axis, means for moving the tool support in synchronism with the rotation of the work holder, a rotatable cutting tool of the end mill type mounted in said support with its axis substantially normal to the axis of rotation of said work, and means to rotate said tool in all positions of the carriage and support.

4. In a machine, the combination of a rotating work holder, a rotatable end cutting milling tool, means for rotating said tool, means for reciprocating the tool in synchronism with the rotation of the work holder substantially normal to the axis of rotation of the work, means for reciprocating the tool in synchronism with the rotation of the work holder in the same plane but at right angles to the first reciprocation, and means for traversing the work and tool in relation to each other.

5. In a machine for forming non-circular cylinders, the combination with a work holder and means for rotating it, of a cutting tool of the end mill type, means for rotating said tool, means for axially reciprocating said tool in synchronism to the rotation of the work holder, means for reciprocating said tool so that its axis moves above and below the work axis at such a rate as to maintain substantially the same cutting radius on the tool end for all positions of the work, and means for traversing the tool and work in respect to each other.

6. In a machine for forming non-circular cylinders, the combination with a work holder and means for continuously rotating it, of a carriage slidable toward and from said work, means for moving the carriage in synchronism with the rotation of the work holder to profile the work, a tool support slidable on said carriage to move in a line in the same plane and at right angles to the line of movement of the carriage to position the tool for best cutting, and an end milling tool mounted on said support.

7. In a machine for forming non-circular cylinders, the combination with a work holder and means for continuously rotating it, of a carriage slidable toward and from said work, means for moving the carriage in synchronism with the rotation of the work holder to profile the work, a tool support slidable on said carriage to move in a line in the same plane and at right angles to the line of movement of the carriage to position the tool for best cutting, and a rotatable milling tool carried by said support, and having a plurality of cutters with their edges lying in a plane at right angles to the axis of rotation of the tool.

8. In a machine for forming non-circular cylinders, the combination with a work holder and means for rotating it at a steady uniform speed, of a carriage slidable toward and from said work, a cam for moving said carriage in one direction, means to drive said cam at at least the same speed as said work holder, a tool support slidable on said carriage in the plane of movement of said carriage but at right angles to the carriage movement, a cam for moving said support, means to drive said second cam at at least the same speed as the work holder, said tool support being in engagement with said second cam and slidable thereover as the carriage moves, and a rotatable tool carried by said support.

9. In a machine for forming non-circular cylinders, the combination with a bed, work holder, and means for rotating it, of a carriage slidable on said bed toward and from the work, a pair of shafts parallel to the axis of the work and driven from and at the same speed as the work holder, a cam on one of said shafts to move said carriage toward said work, resilient means to return said carriage, a tool carrier mounted for reciprocation on said carriage and adapted to move in respect to the carriage substantially tangent to an arc about the work axis, a cam on said second shaft to move said carrier in one direction, resilient means to return said carrier, a rotatable cutting tool mounted in said carrier, and means to provide a relative traverse of the work and tool.

10. In a machine for forming non-circular cylinders, the combination of a rotating work holder, a tool holder, means having a non circular track to effect reciprocating movement of the tool holder toward and from the work once per rotation of the work holder, a rotating cutter having a plurality of radial cutting edges lying in a plane at right angles to the axis of rotation thereof and carried by said tool holder, and means to effect further movement of said tool holder to always present substantially the same portion of each cutting edge of the cutter to the work.

11. In a machine for forming a plurality of non-circular cylinders on a shaft with the cylinders in different angular relationship to each other, the combination with a bed, work holder, and means for rotating it, of a carriage slidable on the bed toward and from the work for each cylinder, a pair of shafts parallel to the axis of the work and driven at the same speed as the work holder, a cam on one of said shafts for each carriage to actuate the same in synchronism and phase to the rotation of its respective cylinder, a tool carrier slidably mounted on each carriage and adapted to move in a plane normal to the work axis and at right angles to the carriage movement, a cam on said second shaft in operative relation to each carrier, a rotatable end cutting milling tool mounted in each carrier, means to rotate said tools, said cams on said second shaft being of such contour and so positioned as to always maintain said tools in the most effective cutting relation to the respective cylinders.

JOHN M. CHRISTMAN.